United States Patent
Kang (10) Patent No.: US 11,307,116 B2
(45) Date of Patent: Apr. 19, 2022

(54) METHOD FOR CONTROLLING PRODUCTION OF MICROTICKS THROUGH DMA

(71) Applicant: HYUNDAI AUTOEVER CORP., Seoul (KR)

(72) Inventor: Tae Gyu Kang, Seongnam-si (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 204 days.

(21) Appl. No.: 16/680,874

(22) Filed: Nov. 12, 2019

(65) Prior Publication Data
US 2020/0149995 A1    May 14, 2020

(30) Foreign Application Priority Data

Nov. 13, 2018  (KR) .................. 10-2018-0139081

(51) Int. Cl.
*G01M 15/06*    (2006.01)
*F02D 41/00*    (2006.01)

(52) U.S. Cl.
CPC .......... *G01M 15/06* (2013.01); *F02D 41/009* (2013.01)

(58) Field of Classification Search
CPC .... F02D 41/28; F02D 41/009; F02D 2250/14; F02D 2250/12; G01M 15/06; G06F 13/28; F01L 2820/042
See application file for complete search history.

(56) References Cited

U.S. PATENT DOCUMENTS

| 2007/0175272 | A1* | 8/2007 | Kondo ............... F02D 41/222 73/114.26 |
| 2017/0292898 | A1* | 10/2017 | Schweikert ........... F02D 41/009 |

FOREIGN PATENT DOCUMENTS

| JP | 2000-134905 A | 5/2000 |
| JP | 2006-211479 A | 8/2006 |
| JP | 2013-156185 A | 8/2013 |
| KR | 10-1998-0069502 A | 10/1998 |
| KR | 20-0139064 Y1 | 12/1998 |
| KR | 10-2007-0098900 A | 10/2007 |

* cited by examiner

*Primary Examiner* — Eric S. McCall
*Assistant Examiner* — Timothy P Graves
(74) *Attorney, Agent, or Firm* — Lempia Summerfield Katz LLC (57) ABSTRACT

A method for controlling production of microticks from a crank sensor signal continuously generated by engine RPM may include: dividing the crank sensor signal within a present period of the crank sensor signal to produce the microticks having a first period through the controller; monitoring the number of microticks produced through the controller; and controlling production of the microticks having the first period by using a direct memory access (DMA) based on the monitoring result through the controller.

8 Claims, 5 Drawing Sheets

METHOD FOR CONTROLLING PRODUCTION OF MICROTICKS THROUGH DMA

CROSS REFERENCE TO RELATED APPLICATION

This application claims priority to and the benefit of Korean Patent Application No. 10-2018-0139081, filed on Nov. 13, 2018, the entire contents of which are incorporated herein by reference.

FIELD

The present disclosure relates to a method for emergently stopping producing microticks through direct memory access (hereinafter, referred to as 'DMA'.

BACKGROUND

The statements in this section merely provide background information related to the present disclosure and may not constitute prior art.

So as to satisfy strict exhaust gas limits and various technical requirements for a vehicle, recently, controllers for electronically controlling an engine, a power train, and a transmission have been mounted on the vehicle.

As functions implemented by the vehicle are continuously increased, like this, internal controllers become complicated and bulky, but since an internal space of the vehicle is limited, installation of increased number of internal controllers increases the weight, volume and price of the vehicle, and thus decreases fuel efficiency of the vehicle. Besides, a high-performance micro controller unit (MCU) or application specific integrated circuit (ASIC) to operate the internal controllers causes a complicated structure and an increase in installation costs.

We have discovered that when a low-performance micro controller unit mounted on a vehicle performs a control logic for controlling such various controllers complicated in structure through the conventional method, control at an accurate time point is not carried out due to software latency.

We have found that even though designation of critical sections and changes in interrupt priority may be adopted to softwarily solve the software latency, the performance of the logic in a limited resource of the micro controller unit may become deteriorated.

SUMMARY

The present disclosure provides a method for emergently stopping producing microticks through DMA that is capable of performing functions operated in a high-performance micro controller unit in a low-performance micro controller unit environment.

In addition, the present disclosure provides a method for emergently stopping producing microticks through DMA that is capable of emergently stopping an operating logic at a desired time point through the DMA, thereby reducing or minimizing delay in a time point of logic processing.

According to one aspect of the present disclosure, a method for controlling production of microticks from a crank sensor signal continuously generated by revolutions per minute (RPM) of an engine includes: dividing, by a microtick producing part of a controller, the crank sensor signal within a present period of the crank sensor signal to produce the microticks having a first period through the controller; monitoring, by a microtick monitoring part of the controller, a number of microticks produced through the controller; and controlling production of the microticks having the first period by using a direct memory access (DMA) based on the monitored number of microticks.

In one form of the present disclosure, the first period is a period of the microticks produced by dividing the crank sensor signal within a past period of the crank sensor signal.

In other form, the method further includes: before producing the microticks, checking a number of microticks calculated based on an angle resolution corresponding to the crank sensor signal.

In other form, the step of monitoring the number of microticks further includes: determining whether the number of microticks having the first period produced is greater than the number of microticks calculated through the controller; and when the number of microticks having the first period produced is greater than the number of microticks calculated, stopping producing the microticks having the first period by using the DMA.

In one aspect of the present disclosure, the step of stopping producing the microticks further includes: setting a second period of the microticks produced within a next period of the crank sensor signal on the basis of the present period of the crank sensor signal.

According to another aspect of the present disclosure, the method further includes: after stopping producing the microticks, dividing the crank sensor signal within the next period of the crank sensor signal; and when a rising edge of the crank sensor signal is sensed, producing the microticks having the second period.

According to another aspect of the present disclosure, a controller for controlling production of microticks from a crank sensor signal continuously generated by RPM of an engine includes: a microtick producing part for configured to divide the crank sensor signal within a present period of the crank sensor signal and produce the microticks having a first period; and a microtick monitoring part configured to monitor a number of microticks produced by the microtick producing part and control production of the microticks having the first period by using a direct memory access (DMA).

In one form, the first period is a period of the microticks produced by dividing the crank sensor signal within a past period of the crank sensor signal.

According to another form of the present disclosure, the controller further includes: a microtick setting part configured to calculate a number of microticks on the basis of an angle resolution corresponding to the crank sensor signal.

In other form, the microtick monitoring part is configured to: determine whether the number of microticks having the first period produced is greater than the number of microticks calculated, and when the number of microticks having the first period produced is greater than the number of microticks calculated, transform a register for producing the microticks into a register for stopping producing the microticks.

According to other aspect of the present disclosure the microtick monitoring part is configured to set a second period of the microticks produced within a next period of the crank sensor signal on the basis of the present period of the crank sensor signal.

In other form, the microtick producing part is configured to: divide the crank sensor signal within the next period of the crank sensor signal, and produce the microticks having the second period when a rising edge of the crank sensor signal is sensed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Objects, characteristics and advantages of the present disclosure will be more clearly understood from the detailed description as will be described below and the attached drawings. Before the present disclosure is disclosed and described, it is to be understood that the disclosed embodiments are merely exemplary of the present disclosure, which can be embodied in various forms. Therefore, specific structural and functional details disclosed herein are not to be interpreted as limiting, but merely as a basis for the claims and as a representative basis for teaching one of ordinary skill in the art to variously employ the present disclosure in virtually any appropriately detailed structure.

All terms used herein, including technical or scientific terms, unless otherwise defined, have the same meanings which are typically understood by those having ordinary skill in the art.

The terms, such as ones defined in common dictionaries, should be interpreted as having the same meanings as terms in the context of pertinent technology, and should not be interpreted as having ideal or excessively formal meanings unless clearly defined in the specification. Terms used in this application are used to only describe specific exemplary embodiments and are not intended to restrict the present disclosure. An expression referencing a singular value additionally refers to a corresponding expression of the plural number, unless explicitly limited otherwise by the context.

In this application, terms, such as "comprise", "include", or 'have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

Now, the present disclosure is disclosed in detail with reference to the attached drawings.

Figure 1:
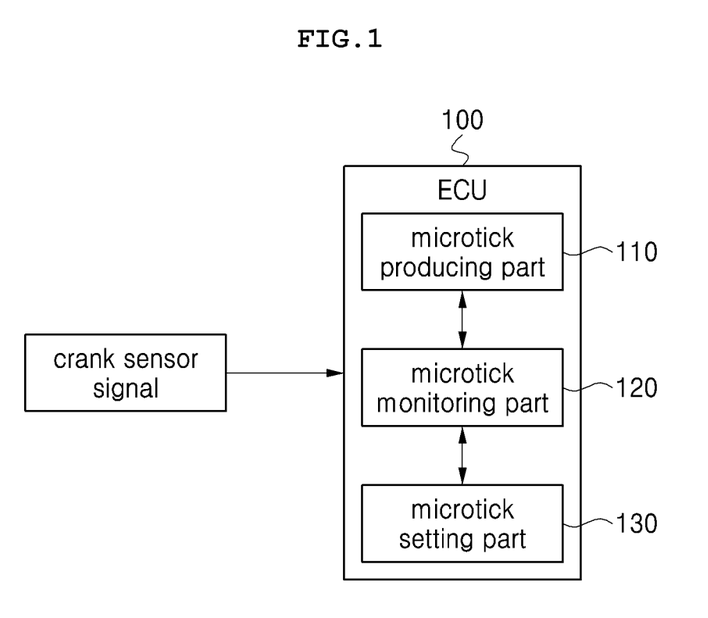
FIG. 1 is a block diagram showing a configuration of an electronic control unit.
Figure 2A:
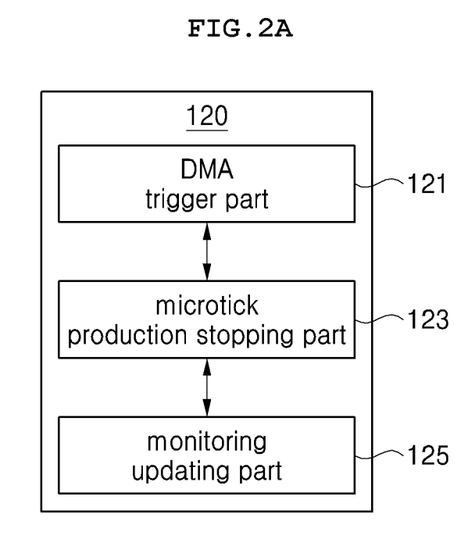
FIGS. 2A and 2B are block diagrams showing components of a microtick monitoring part and a microtick setting part of the electronic control unit.
Figure 2B:
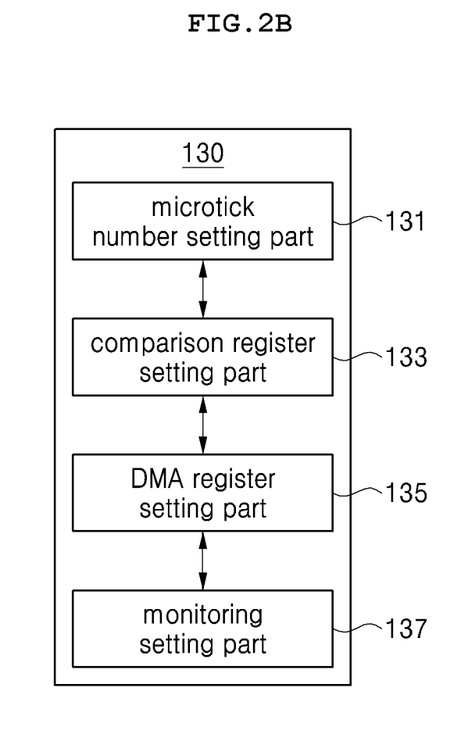

FIG. 1 is a block diagram showing a configuration of an electronic control unit according to one form of the present disclosure, and FIGS. 2A and 2B are block diagrams showing components of a microtick monitoring part and a microtick setting part of the electronic control unit according to one form of the present disclosure.

As shown in FIG. 1, an electronic control unit 100 includes: a microtick producing part 110, a microtick monitoring part 120, and a microtick setting part 130, and it may include additional parts so as to achieve the objects of the present disclosure. Here, the electronic control unit 100 (namely, a controller) for an engine may be embodied in a hardware manner (e.g., a processor), a software manner, or combination of the hardware and the software manner (i.e., a series of commands), which process at least one function or operation.

The microtick producing part 110 serves to divide a single clock into several hundreds of microticks to precisely control a crank sensor signal received from an engine controller. In this case, each microtick is a clock having a shorter period than that of the clock in the crank sensor signal, and the microtick producing part 110 produces several hundreds of microticks having shorter periods than the period of the crank sensor signal from the crank sensor signal having one period, thereby providing an environment where the crank sensor signal is precisely controlled.

So as to divide the crank sensor signal into several hundreds of microticks, further, periods of the microticks may be set in the microtick producing part 110. In more detail, the periods of the microticks may be differently set based on time points at which the electronic control unit 100 divides the crank sensor signal.

For example, if the electronic control unit 100 receives a first crank sensor signal from the engine controller, the periods of the microticks produced by the microtick producing part 110 are calculated by dividing an already stored period of the crank sensor signal into the number of microticks to be produced.

Contrarily, if the electronic control unit 100 receives continuous crank sensor signals from the engine controller, a period (hereinafter, referred to as 'first period') of microticks produced at a present time point by the microtick producing part 110 is a period of microticks produced by dividing the crank sensor signal within a past period of the crank sensor signal.

Under the assumption that the period at the past time point of the crank sensor signal and the period at the present time point of the crank sensor signal are constant, in detail, the microtick producing part 110 divides the crank sensor signal within the present period to produce the microticks having the first period.

The microtick monitoring part 120 serves to continuously monitor the number of microticks produced by the microtick producing part 110 to control production of the microticks having the first period.

Referring to FIG. 2A, the microtick monitoring part 120 includes a DMA trigger part 121, a microtick production stopping part 123, and a monitoring updating part 125 according to division in functions thereof.

In more detail, the DMA trigger part 121 checks the number of microticks having the first period produced, and if the checked number of microticks is greater than the set number of microticks, the DMA trigger part 121 performs the DMA through which a register for stopping production of the microticks is operated.

If the DMA is performed by the DMA trigger part 121, also, the microtick production stopping part 123 serves to transform a register for producing the microticks into the register for stopping producing the microticks through the DMA, thereby preventing the microticks from being produced additionally.

After the production of microticks is stopped after the transform of the register through the DMA, the monitoring updating part 125 serves to check the present period of the crank sensor signal, set a second period of microticks corresponding to the checked present period of the crank sensor signal, and store the set second period of microticks.

Like this, the monitoring updating part 125 sets and stores the second period of microticks, so that if a rising edge of the crank sensor signal is sensed after the present period is finished, the microtick producing part 110 divides the crank sensor signal within a next period of the crank sensor signal to produce the microticks having the second period, thereby preventing the number of microticks produced thereby from being greater than the number of microticks set in the same manner as in the present period.

Referring back to FIG. 1, the microtick setting part 130 of the electronic control unit 100 serves to set various conditions that become standards for the operations of the microtick producing part 110 and the microtick monitoring part 120.

As shown in FIG. 2B, the microtick setting part 130 includes a microtick number setting part 131, a comparison register setting part 133, a DMA register setting part 135, and a monitoring start setting part 137 according to division in functions thereof.

In more detail, the microtick number setting part 131 calculates the number of microticks to be produced within one period of the crank sensor signal on the basis of angle resolution corresponding to the crank sensor signal, and the comparison register setting part 133 sets the calculated number of microticks as a reference value used in the monitoring process of the microtick monitoring part 120.

Also, the DMA register setting part 135 stores setting results of the DMA trigger part 121 to allow the DMA trigger part 121 to be operated. Accordingly, the DMA register setting part 135 sets the number of microticks produced as a start address of the DMA trigger part 121 and sets the register of the microtick producing part 110 for producing the microticks as an arrival address of the DMA trigger part 121, thereby allowing the DMA trigger part 121 to perform the DMA.

On the other hand, the monitoring start setting part 137 serves to convert interrupting and comparing functions into an enabled state according to the inputting and setting results of the above-mentioned setting parts so as to allow the microtick monitoring part 120 to monitor production of the microticks.

Up to now, the detailed configuration of the electronic control unit 100 according to the present disclosure has been explained. According to the present disclosure, the electronic control unit 100 produces several hundreds of microticks from one period of the crank sensor signal, thereby more precisely controlling a moving angle of a crankshaft sensed by a crank sensor. Hereinafter, a method for controlling production of the microticks through the electronic control unit 100 according to the present disclosure will be described.

Figure 3:
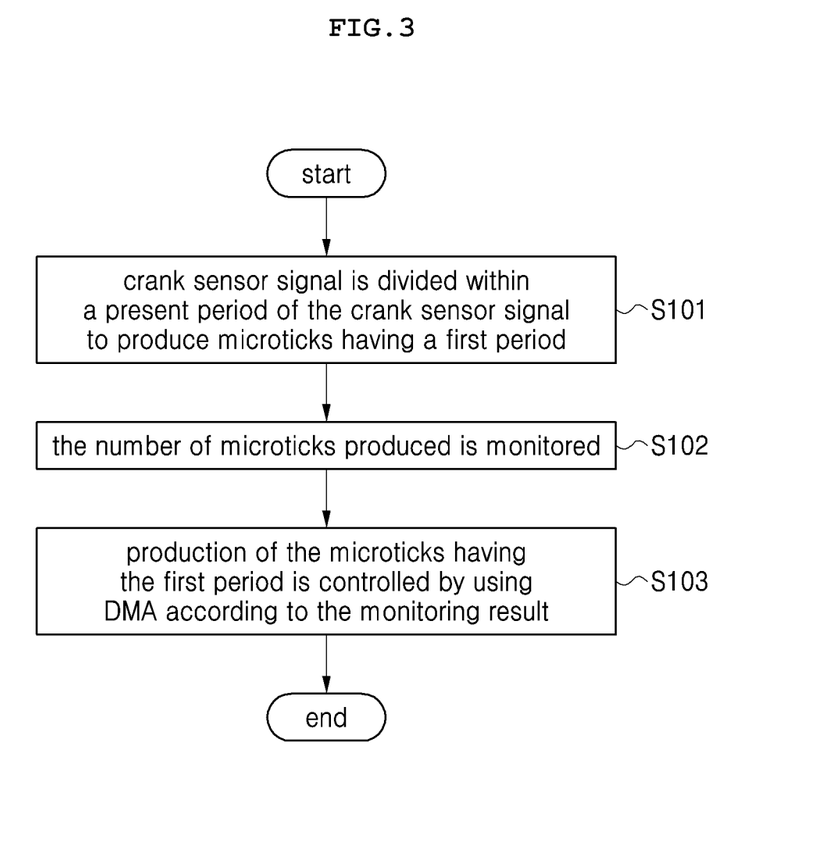
FIG. 3 is a flowchart showing a method for emergently stopping producing microticks through the electronic control unit.

FIG. 3 is a flowchart showing a method for emergently stopping producing microticks through the electronic control unit 100 according to the present disclosure.

On the other hand, the method as shown in FIG. 3 is only a desirable embodiment of the present disclosure so as to achieve the objects of the present disclosure. If desired, of course, some of steps may be deleted or added, or one step may be carried out in another step.

Referring to FIG. 3, a crank sensor signal is divided within a present period thereof to produce microticks having a first period (at step S101).

As mentioned above, the crank sensor signal is a continuous signal, and therefore, the period of microticks produced in a past period of the crank sensor signal can be still used to produce the microticks.

Before the microticks are produced, on the other hand, the number of microticks to be produced on the basis of the angle resolution corresponding to the crank sensor signal is calculated through the electronic control unit 100. In this case, one period of the crank sensor signal means a moving angle of the crankshaft sensed by the crank sensor, and the angle resolution is an index through which the moving angle within one period can be finely divided, so that the electronic control unit 100 can calculate in advance the number of microticks on the basis of the angle resolution.

After the step S101, the number of microticks produced is continuously monitored through the electronic control unit 100 (at step S102).

In addition to the number of microticks, in this case, time elapsed up to the time point where the present period of the crank sensor signal is finished is measured through the electronic control unit 100, and if the number of microticks produced from the crank sensor signal is greater than the number of microticks calculated, time corresponding to one period is reflected to set a new period of the microticks.

After the monitoring result of the step S102, production of microticks having a first period is controlled using the DMA through the electronic control unit 100.

In detail, the DMA, which is used to reduce data transfer load, is adopted in the process of producing and monitoring the microticks, through the electronic control unit 100, thereby producing and controlling the microticks more rapidly.

Figure 4:
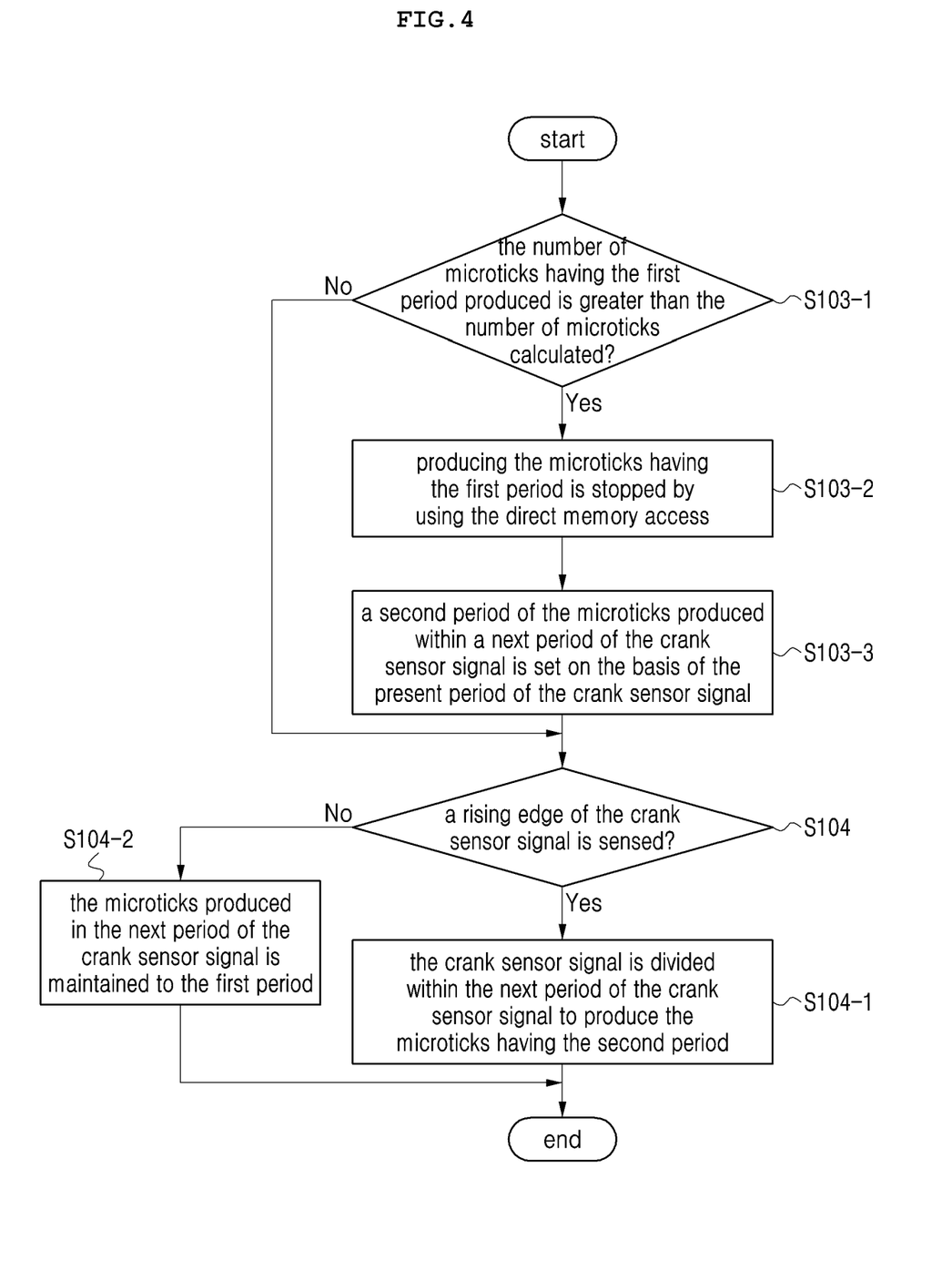
FIG. 4 is a flowchart showing the step S103 of FIG. 3.

FIG. 4 is a flowchart showing the step S103 of FIG. 3.

Referring to FIG. 4, it is determined through the electronic control unit 100 whether the number of microticks having the first period produced is greater than the number of microticks calculated (at step S103-1).

In detail, if RPM of the engine connected to the electronic control unit 100 is increased, a period of the crank sensor signal becomes shorter than the past period thereof, and if the RPM of the engine is decreased, a period of the crank sensor signal becomes longer than the past period thereof, so that the process for producing the microticks can be continuously monitored so as to respond to the varied periods of the crank sensor signal.

If it is determined that the number of microticks having the first period produced is greater than the number of microticks calculated at the step S103-1, producing the microticks is stopped through the DMA (at step S103-2 if Yes).

To do this, a register for producing the microticks is immediately transformed into a register for stopping producing the microticks through the DMA to prevent the microticks from being produced further through the electronic control unit 100.

After the step S103-2, also, a falling edge of the crank sensor signal is checked to measure a present period of the crank sensor signal, and next, a period, that is, second period of microticks produced corresponding to the present period and the calculated number of microticks is set (at step S103-3).

On the other hand, if it is determined that the number of microticks having the first period produced is not greater than the number of microticks calculated at the step S103-1, it is checked whether a rising edge of the crank sensor signal is sensed through the electronic control unit 100 (at step S104 if No).

If a new continuous crank sensor signal is sensed after the present period is finished, it is divided within a next period thereof through the electronic control unit 100 to produce the microticks having the second period (at step S104-1 if Yes).

On the other hand, if it is determined that the number of microticks having the first period produced is not greater than the number of microticks calculated at the step S104 and if the new crank sensor signal is sensed, it is determined through the electronic control unit 100 that the RPM of the engine is maintained so that the period of the crank sensor signal is the same as the past period. Accordingly, the period of microticks produced within the next period is kept to the first period which is the same as the present period (at step S104-2 if No).

Up to now, the method for emergently stopping producing the microticks through the electronic control unit 100 according to the present disclosure has been explained. According to the present disclosure, the electronic control unit 100 adopts the DMA with no large load on time in a situation where production of the microticks from the crank sensor signal has to be emergently stopped, thereby producing the accurate number of microticks within one period of the crank sensor signal, without any error.

Figure 5:
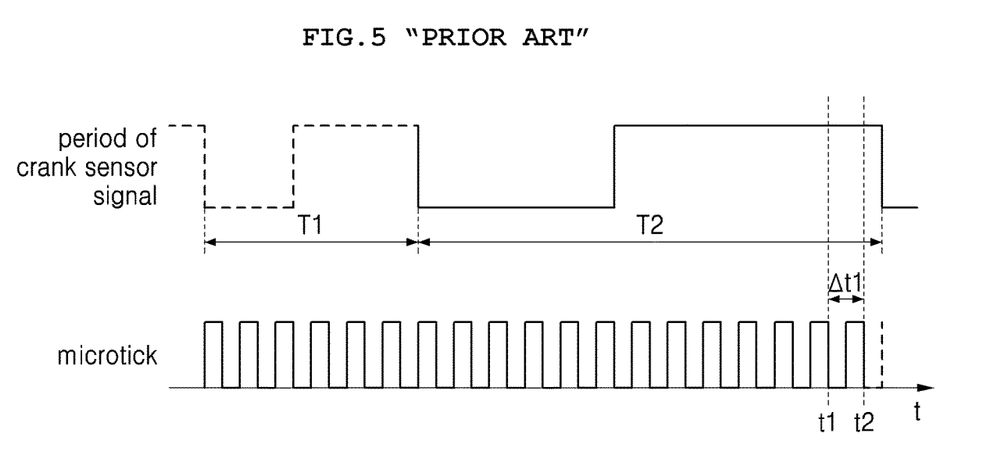
FIG. 5 shows a conventional process for controlling production of microticks.
Figure 6:
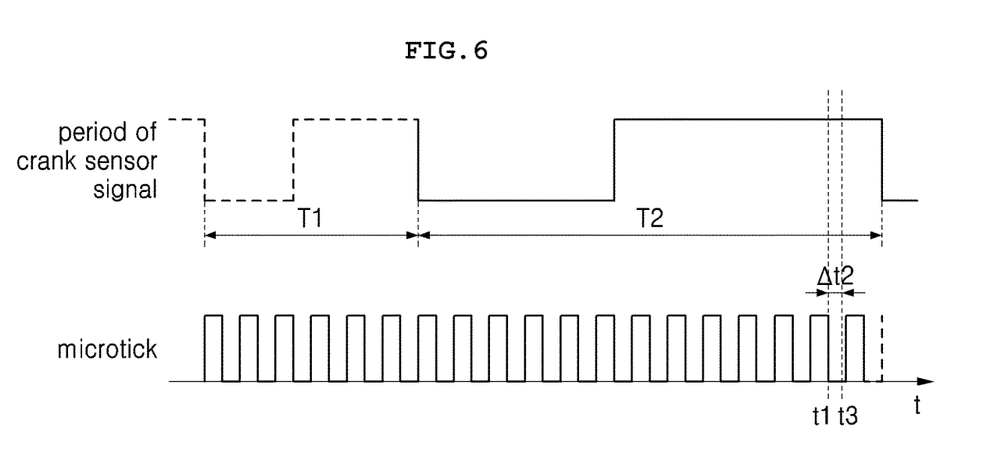
FIG. 6 shows a process for controlling production of microticks through the electronic control unit.

FIG. 5 shows a conventional process for controlling production of microticks, and FIG. 6 shows a process for controlling production of microticks through the electronic control unit according to the present disclosure.

Referring to FIG. 5, if the RPM of the engine is decreased to cause a present period T2 to be extended more than a past period T1, the microticks produced within the present period T2 are all produced at a time point t1 with the number of microticks in advance calculated. In case where a conventional method where the microticks are softwarily produced, accordingly, a control process of a logic itself becomes slow, and also, a priority of the control logic is not high, so that if an emergent situation occurs in other logics, producing the microticks may be stopped at a time point t2. In detail, delay time $\Delta t1$ is made, and if the delay time is long, the number of microticks produced is increased, so that after that, a separate process for compensating for the increased microticks should be carried out.

Referring to FIG. 6, contrarily, if the number of microticks to be produced within the present period T2 is greater than that in advanced calculated at the time point t1, a register for stopping producing the microticks is immediately operated according to priority, thereby stopping producing the microticks at a time point t3. Even if the DMA is used, fine delay time $\Delta t2$ is made, but the delay time is a remarkably smaller value than the delay time $\Delta t1$. Also, no microtick is additionally produced within the delay time $\Delta t1$.

Like this, the electronic control unit 100 according to the present disclosure can rapidly control production of the microticks from the crank sensor signal of the RPM of the engine through the DMA, so that no small error occurs in the process where the crankshaft is moved. Also, the electronic control unit 100 according to the present disclosure can utilize the existing DMA, so that no high-performance MCU environment is needed to control various controllers, thereby achieving more efficient control in view of costs and effects.

As described above, the electronic control unit according to the present disclosure can continuously monitor the crank sensor signal changed and emergently stop an operating logic in signal processing at a desired time point through the DMA, thereby reducing or minimizing additional crank sensor signal processing.

The foregoing description of the embodiments of the present disclosure has been presented for the purpose of illustration; it is not intended to be exhaustive or to limit the present disclosure to the precise forms disclosed. Persons skilled in the relevant art can appreciate that many modifications and variations are possible in light of the above teachings. It is therefore intended that the scope of the present disclosure be limited not by this detailed description, but rather by the claims appended hereto.

What is claimed is:

1. A method for controlling production of microticks from a crank sensor signal continuously generated by revolutions per minute (RPM) of an engine, the method comprising:
    before producing the microticks, checking a number of microticks calculated based on an angle resolution corresponding to the crank sensor signal;
    dividing, by a microtick producing part of a controller, the crank sensor signal within a present period of the crank sensor signal to produce the microticks having a first period through the controller;
    monitoring, by a microtick monitoring part of the controller, the number of microticks produced through the controller;
    setting a second period of the microticks produced within a next period of the crank sensor signal based on a present extended period of the crank sensor signal when the monitored number of microticks having the first period is greater than the calculated number of microticks; and
    controlling production of the microticks having the first period by using a direct memory access (DMA) based on the monitored number of microticks.

2. The method according to claim 1, wherein the first period is a period of the microticks produced by dividing the crank sensor signal within a past period of the crank sensor signal.

3. The method according to claim 1, wherein monitoring the number of microticks further comprises:
    determining whether the monitored number of microticks having the first period produced is greater than the number of microticks calculated through the controller; and
    when the monitored number of microticks having the first period produced is greater than the number of microticks calculated, stopping producing the microticks having the first period by using the DMA.

4. The method according to claim 3, further comprising:
    after stopping producing the microticks, dividing the crank sensor signal within the next period of the crank sensor signal; and
    when a rising edge of the crank sensor signal is sensed, producing the microticks having the second period.

5. A controller for controlling production of microticks from a crank sensor signal continuously generated by revolutions per minute (RPM) of an engine, the controller comprising:
- a microtick setting part configured to calculate a number of microticks based on an angle resolution corresponding to the crank sensor signal;
- a microtick producing part configured to divide the crank sensor signal within a present period of the crank sensor signal and produce the microticks having a first period; and
- a microtick monitoring part configured to monitor the number of microticks produced by the microtick producing part and control production of the microticks having the first period by using a direct memory access (DMA),
- wherein the microtick monitoring part is further configured to set a second period of the microticks produced within a next period of the crank sensor signal based on the present period of the crank sensor signal when the monitored number of microticks having the first period is greater than the calculated number of microticks.

6. The controller according to claim 5, wherein the first period is a period of the microticks produced by dividing the crank sensor signal within a past period of the crank sensor signal.

7. The controller according to claim 5, wherein the microtick monitoring part is configured to:
- determine whether the monitored number of microticks having the first period produced is greater than the number of microticks calculated, and
- when the monitored number of microticks having the first period produced is greater than the calculated number of microticks, transform a register for producing the microticks into a register for stopping producing the microticks.

8. The controller according to claim 7, wherein the microtick producing part is configured to:
- divide the crank sensor signal within the next period of the crank sensor signal, and
- when a rising edge of the crank sensor signal is sensed, produce the microticks having the second period.

* * * * *